H. A. BOYLES.
TRAMPING MECHANISM.
APPLICATION FILED JAN. 29, 1917.

1,236,537.

Patented Aug. 14, 1917.
4 SHEETS—SHEET 1.

Witnesses

H. A. Boyles   Inventor by

Attorneys

H. A. BOYLES.
TRAMPING MECHANISM.
APPLICATION FILED JAN. 29, 1917.

1,236,537.

Patented Aug. 14, 1917.
4 SHEETS—SHEET 2.

Fig. 2.

Witnesses

H. A. Boyles  Inventor by

Attorneys

H. A. BOYLES.
TRAMPING MECHANISM.
APPLICATION FILED JAN. 29, 1917.

1,236,537.

Patented Aug. 14, 1917.
4 SHEETS—SHEET 3.

Witnesses

H. A. Boyles
Inventor by

Attorneys

H. A. BOYLES.
TRAMPING MECHANISM.
APPLICATION FILED JAN. 29, 1917.

1,236,537.

Patented Aug. 14, 1917.
4 SHEETS—SHEET 4.

Witnesses

H. A. Boyles inventor by Attorneys

UNITED STATES PATENT OFFICE.

HOMER A. BOYLES, OF WICHITA FALLS, TEXAS.

TRAMPING MECHANISM.

1,236,537. Specification of Letters Patent. Patented Aug. 14, 1917.

Application filed January 29, 1917. Serial No. 145,200.

*To all whom it may concern:*

Be it known that I, HOMER A. BOYLES, a citizen of the United States, residing at Wichita Falls, in the county of Wichita and State of Texas, have invented a new and useful Self-Throttling Tramping Mechanism for Cotton-Gins, of which the following is a specification.

This invention relates to self throttling tramping apparatus for use in connection with cotton gins, one of its objects being to provide a valve of improved form which will automatically reverse the action of the follower of the tramper whereby said follower can be raised and lowered automatically at predetermined intervals, without requiring the constant attention of an operator.

A further object is to provide a feeding attachment for the tramper and which works automatically, the same receiving its power from the tramping mechanism.

A still further object is to provide simple and efficient mechanism for transmitting motion to the valve for the purpose of reversing the action of the pressure, thereby to correspondingly reverse the movement of the follower.

Another object is to provide means constantly under the control of the operator whereby the operation of the valve can be stopped or can be reversed whenever desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 2 is an enlarged elevation of that side of the valve and its operating mechanism opposite to that shown in Fig. 1.

Figure 1:
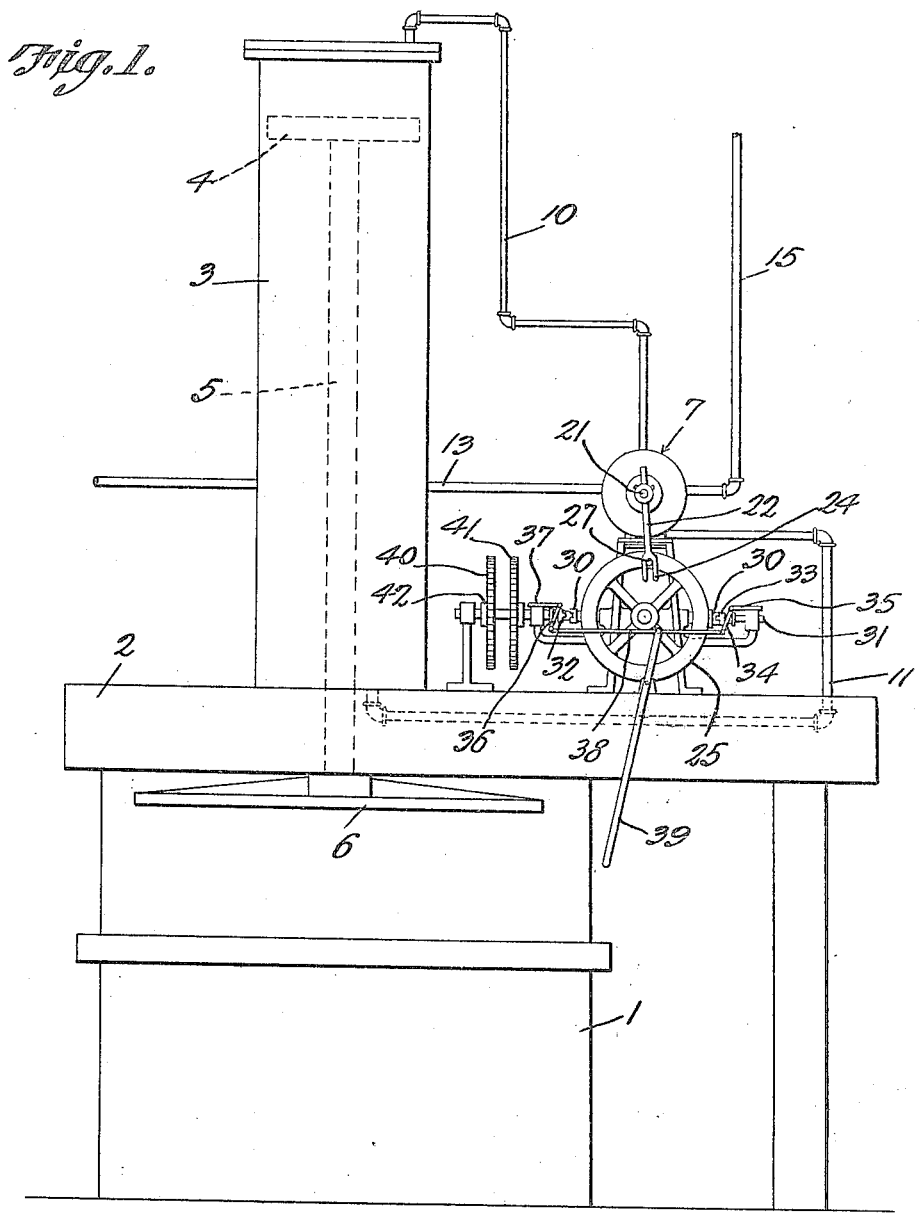
Figure 1 is a front elevation of the apparatus embodying the present improvements.
Figure 3:
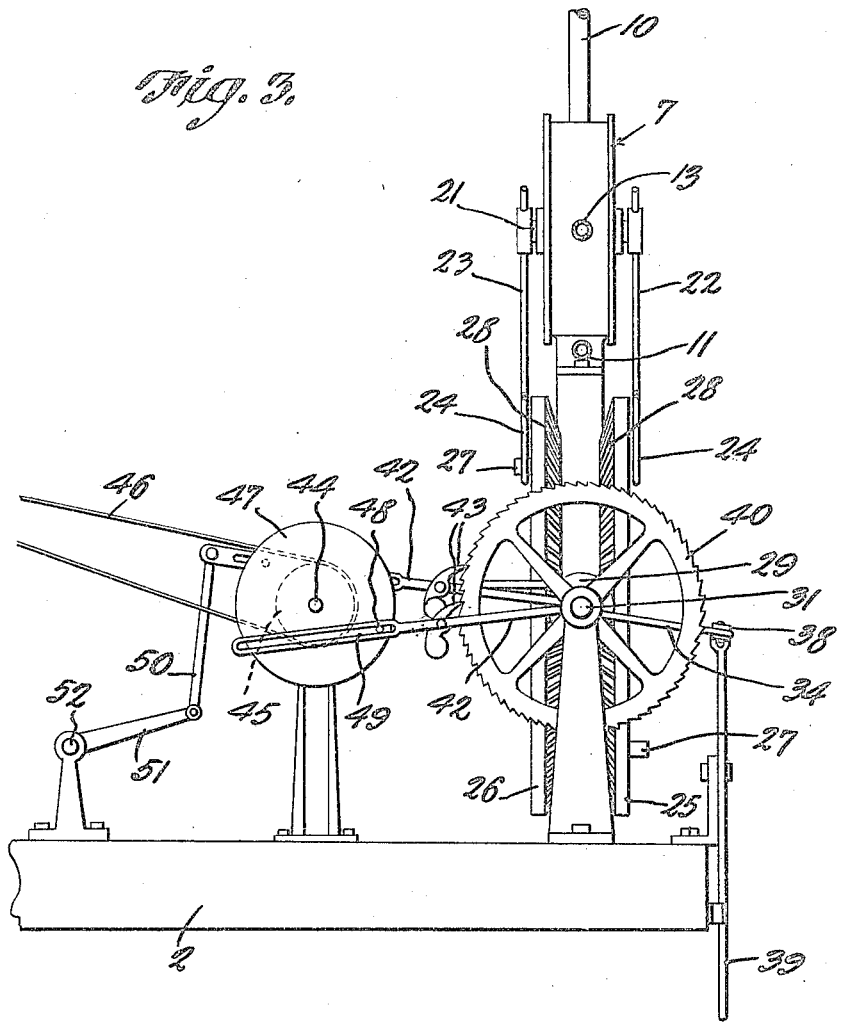
Fig. 3 is a side elevation of the mechanism shown in Fig. 2.
Figure 4:
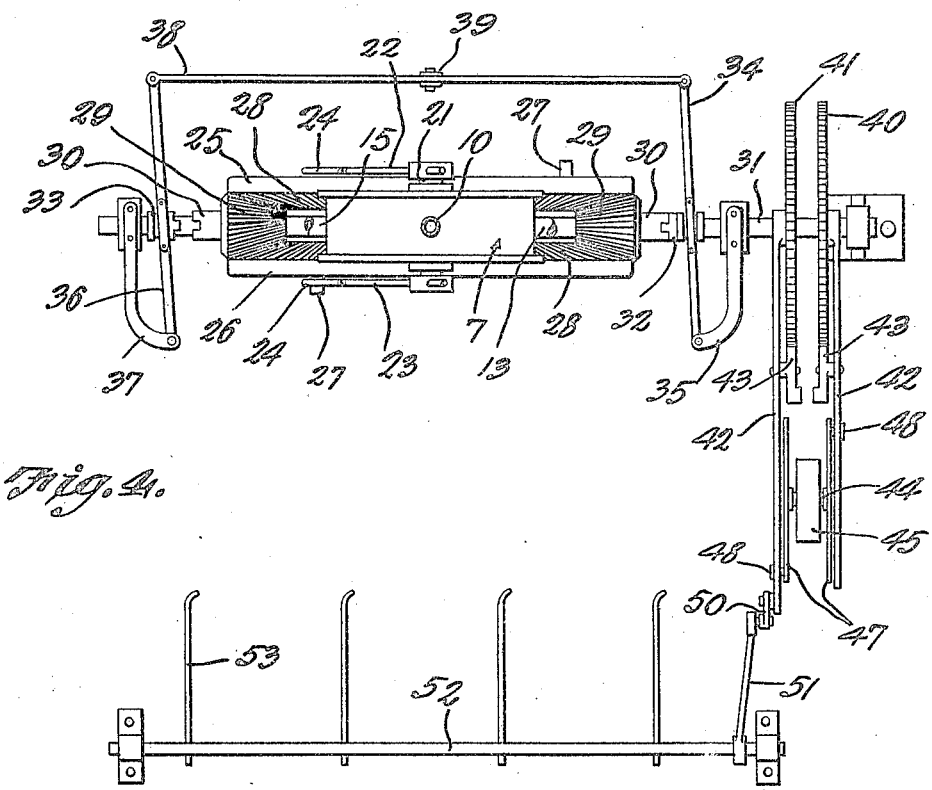
Fig. 4 is a plan view of the apparatus and showing the feeder and the connections between the feeder and the valve mechanism.
Figure 5:
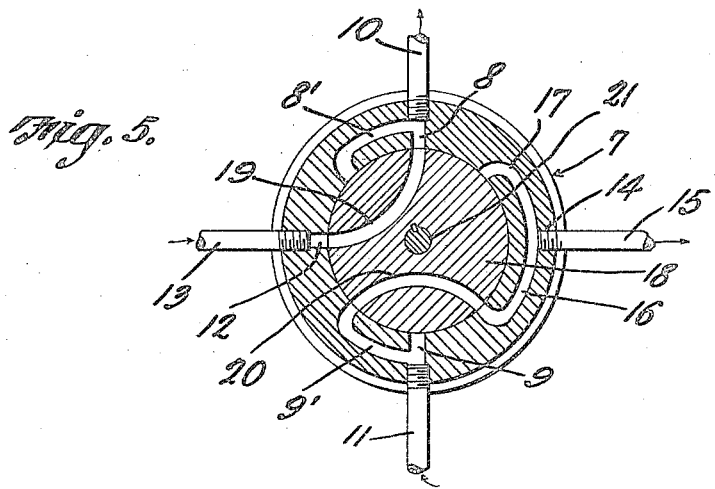
Fig. 5 is a section through the valve of the mechanism.

Referring to the figures by characters of reference 1 designates the press box above which are supported sills 2 and on these sills is mounted a cylinder 3. A piston 4 is mounted to work within the cylinder and has a rod 5 which projects downwardly from the cylinder and is attached to the head or follower of the tramper, which has been indicated at 6. A valve casing 7 is supported adjacent the cylinder and has diametrically opposed outlets 8 and 9, the outlet 8 being connected by a pipe 10 to the upper end of the cylinder 3, while the outlet 9 is connected by a pipe 11 to the lower end of the cylinder 3. Outlet 8 has a by-pass 8' formed within the wall of the casing 7 and opening into the interior of the casing. The outlet 9 is also provided with a by-pass 9' similar to the by-pass 8' and opening into the interior of casing 7. The two by-passes 8' and 9' are extended toward each other and located midway between them an inlet port 12 to which steam or other fluid under pressure may be supplied through a pipe 13. Arranged within the casing at a point diametrically opposite the inlet port 12 is an exhaust port 14 from which extends an exhaust pipe 15 and this exhaust port opens into oppositely extending passages 16 and 17 formed in the wall of casing 7 and opening into the interior of the casing at points equidistant from the port 14.

A cylindrical valve 18 is mounted for rotation within the casing 7 and is provided with arcuate passages 19 and 20 so proportioned and located that when the passage 19 is in communication with inlet port 12 it also communicates with the outlet port 8 and the passage 20 at the same time maintains communication between the by-pass 9' and the passage 16. When the valve 18 is moved to its other extreme position the passage 19 will establish communication between the by-pass 8' and the passage 17, while the passage 20 will establish communication between the inlet port 12 and the outlet 9.

Valve 18 rotates with a shaft 21 the ends of which project from the sides of the casing 7 and have secured to them parallel arms 22 and 23 the lower end of each of which is forked as at 24. Mounted for rotation below the valve casing 7 and between the forked ends of the arms 22 and 23 are wheels 25 and 26 having outstanding wrist pins 27. On the inner faces of these wheels are provided bevel gears 28 and interposed between and constantly meshing with these gears are pinions 29 each of which has a clutch member 30. A shaft 31 is extended through and supports these pinions and is adapted to rotate freely therein. Feathered on the shaft are clutch members 32 and 33, the clutch member 32 being engaged by and revoluble within a lever 34 fulcrumed on a bracket 35 while the clutch member 33 is similarly engaged by a lever 36 fulcrumed on a bracket 37. The two levers are coupled together by a rod 38 so that by shifting this rod in one direction by means of a hand lever 39 or in any other suitable manner the clutch member 33 will engage the clutch member 30, while the clutch member 32 will become disengaged from the adjacent clutch member 30, thereby coupling one of the pinions 29 to the shaft 31. By shifting the rod 38 in the opposite direction the other pinion 29 will be coupled to shaft 31 while the first mentioned pinion 29 will be uncoupled. Thus it will be seen that the direction of rotation of the gears 28 can be readily reversed simply by shifting the hand lever 39.

Secured to the shaft 31 are ratchet wheels 40 and 41 and pivotally mounted on the shaft 31 and adjacent each of the ratchet wheels is a lever 42 carrying a pawl 43. The pawl engages the peripheral portion of the adjacent ratchet wheel and when the lever is moved in one direction the pawl will slip over a tooth of the wheel whereas when the lever is moved in the opposite direction the ratchet wheel will be moved through the space of one tooth and a corresponding movement of the shaft 31 will be set up.

A shaft 44 is journaled adjacent the ratchet wheels 40 and 41 and secured to this shaft is a drive pulley 45 adapted to receive motion through a belt 46 or the like. The pulley is arranged between disks 47 likewise secured to and revoluble with the shaft 44 and these disks have wrist pins 48 outstanding therefrom and adapted to work within longitudinal slots 49 formed in the levers 42. The wrist pin on one of the disks is diametrically opposite the wrist pin on the other disk so that when the disks are rotating the levers 42 will operate in opposite directions respectively.

One of the levers 42 is connected by a link 50 to an arm 51 extending radially from a shaft 52. This shaft has feeding fingers 53 projecting therefrom and as the lever 42 is oscillated, motion will be transmitted therefrom through the link 50 and arm 51 to the shaft 52 with the result that fingers 53 will also be oscillated and feed cotton to the tramper.

Pressure is constantly supplied to the valve casing through the pipe 13. As the shaft 44 is rotated by means of pulley 45 the two arms 42 are oscillated and the pawls 43 carried thereby will alternately engage and propel the ratchet wheels 40 and 41 so that practically a continuous rotation of the shaft 31 will be set up and motion will thus be transmitted from the shaft through one of the pinions 29, to wheels 25 and 26 which will be rotated in opposite directions by said pinion. If both of the pinions 29 are uncoupled from the shaft 31 the wheels 25 and 26 will not be actuated. The wrist pins 27 on the wheels 25 and 26 are diametrically opposed and as these wheels gradually turn, one of the wrist pins will come into engagement with the forked end of the arms 22 and 23 adjacent thereto and swing it through an arc sufficient to change the passages 19 and 20 in the valve 18 from one position to another. Thus if the pressure is being directed through the inlet 12 by pipe 10 and the pipe 11 is in communication with the exhaust pipe 15, at which time the follower 6 is pressed downwardly to its lowermost position, then when the arm is swung in the manner described, the inlet 12 will be placed in communication with the pipe 11, while the pipe 10 will be placed in communication with the exhaust. Consequently, the follower will be immediately shifted to its other or raised position, the steam or other fluid under pressure within the cylinder and above the piston escaping to the exhaust pipe 15. The parts will remain in this position while the ratchet wheels are slowly rotated and the feeding shaft 52 is rapidly rocked. On the completion of one half rotation of the wheels 25 and 26 the other wrist pin will engage the forked portion of the other arm 22 or 23, thereby swinging the valve back to its initial position and causing the direction of the pressure again to be reversed with a corresponding reversal of movement of the follower.

It will be apparent that by providing mechanism such as described, the operation will be performed automatically and the only need of an attendant is to shift the clutch members 32 and 33 whenever desired for the purpose either of quickly reversing the movement of the follower or to uncouple the pinions from their shaft 31.

What is claimed is:—

1. In a cotton tramper, the combination with a follower, a valve, and pressure operated means under the control of the valve for raising and lowering the follower, of arms movable with the valve, elements revoluble in opposite directions respectively for successively engaging the respective arms to rotate the valve in opposite directions successively, means for simultaneously rotating said elements, a drive element, and speed reducing means for transmitting motion from said drive element to the oppositely revoluble elements.

2. In a cotton tramper, the combination with a follower, a valve, and pressure operated means under the control of the valve for raising and lowering the follower, of arms movable with the valve, elements revoluble in opposite directions respectively for successively engaging the respective arms to rotate the valve in opposite directions successively, means for simultaneously rotating said elements, a drive element, speed reducing means for transmitting motion from said drive element to the oppositely revoluble elements, said means including levers, means revoluble with the drive element for oscillating the levers, a pawl carried by each lever, ratchet wheels adapted to be engaged alternately by the pawls, and gears for transmitting motion from the ratchet wheels to the oppositely revoluble elements.

3. In a cotton tramper, the combination with a follower, a valve, and pressure operated means under the control of the valve for raising and lowering the follower, of arms movable with the valve, elements revoluble in opposite directions respectively for successively engaging the respective arms to rotate the valve in opposite directions successively, means for simultaneously rotating said elements, a drive element, speed reducing means for transmitting motion from said drive element to the oppositely revoluble elements, said means including levers, means revoluble with the drive element for oscillating the levers, a pawl carried by each lever, ratchet wheels adapted to be engaged alternately by the pawls, gears for transmitting motion from the ratchet wheels to the oppositely revoluble elements, and means for coupling and uncoupling the gears to reverse or stop the actuation of the oppositely revoluble elements.

4. In a cotton tramper, the combination with a follower, a valve, and pressure operated means under the control of the valve for raising and lowering the follower, of arms movable with the valve, elements revoluble in opposite directions respectively for successively engaging the respective arms to rotate the valve in opposite directions successively, means for simultaneously rotating said elements, a drive element, speed reducing means for transmitting motion from said drive element to the oppositely revoluble elements, said means including levers, means revoluble with the drive element for oscillating the levers, a pawl carried by each lever, ratchet wheels adapted to be engaged alternately by the pawls, and gears for transmitting motion from the ratchet wheels to the oppositely revoluble elements.

In testimony that I claim the foregoing as my own, I have hereto affixed my signature in the presence of two witnesses.

HOMER A. BOYLES.

Witnesses:
  LESLIE HUMPHREY,
  T. R. BOONE.

Copies of this patent may be obtained for five cents each, by addressing the "Commissioner of Patents, Washington, D. C."